US010552621B2

(12) United States Patent
Smith et al.

(10) Patent No.: US 10,552,621 B2
(45) Date of Patent: *Feb. 4, 2020

(54) ESTABLISHING HARDWARE ROOTS OF TRUST FOR INTERNET-OF-THINGS DEVICES

(71) Applicant: INTEL CORPORATION, Santa Clara, CA (US)

(72) Inventors: Ned M. Smith, Beaverton, OR (US); Victoria C. Moore, Phoenix, AZ (US); Reshma Lal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,240

(22) Filed: Sep. 24, 2018

(65) Prior Publication Data

US 2019/0026477 A1 Jan. 24, 2019

Related U.S. Application Data

(63) Continuation of application No. 14/751,531, filed on Jun. 26, 2015, now Pat. No. 10,083,306.

(51) Int. Cl.
| | | |
|---|---|---|
| *G06F 21/50* | (2013.01) | |
| *G06F 21/60* | (2013.01) | |
| *G06F 9/38* | (2018.01) | |
| *G06F 21/85* | (2013.01) | |
| *G06F 21/71* | (2013.01) | |
| *G06F 21/72* | (2013.01) | |
| *G06F 21/62* | (2013.01) | |
| *G06F 9/30* | (2018.01) | |
| *G06F 21/57* | (2013.01) | |

(Continued)

(52) U.S. Cl.
CPC ........ *G06F 21/602* (2013.01); *G06F 9/30145* (2013.01); *G06F 9/3877* (2013.01); *G06F 21/6218* (2013.01); *G06F 21/71* (2013.01); *G06F 21/72* (2013.01); *G06F 21/85* (2013.01); *G06F 9/44* (2013.01); *G06F 9/4401* (2013.01); *G06F 21/50* (2013.01); *G06F 21/575* (2013.01); *G06F 21/62* (2013.01)

(58) Field of Classification Search
CPC .......... G06F 21/50; G06F 21/575; G06F 9/44; G06F 9/4401; G06F 11/30; G06F 12/14; G06F 21/60; G06F 9/38; G06F 21/85; G06F 21/71; G06F 21/72; G06F 21/62; G06F 9/30; G06F 21/57; H04L 63/0877; H04L 63/0897

See application file for complete search history.

(56) References Cited

U.S. PATENT DOCUMENTS

| | | | | |
|---|---|---|---|---|
| 2012/0079287 | A1* | 3/2012 | Leclercq | G06F 21/575 713/192 |
| 2013/0124840 | A1* | 5/2013 | Diluoffo | G06F 21/575 713/2 |

(Continued)

*Primary Examiner* — Jayesh M Jhaveri

(57) ABSTRACT

An Internet-of-Things (IoT) device platform to communicate in a trusted portion of an IoT network is disclosed. The trusted IoT platform can include a secure IoT system-on-chip (SoC) and can be integrated into various devices such that each of the devices may implement "roots of trust" to establish a trusted portion, or a trusted backbone, of the IoT network.

25 Claims, 11 Drawing Sheets

(51) Int. Cl.
*G06F 9/44* (2018.01)
*G06F 9/4401* (2018.01)

(56) References Cited

U.S. PATENT DOCUMENTS

| | | | |
|---|---|---|---|
| 2014/0047548 A1* | 2/2014 | Bye | G06F 21/74 |
| | | | 726/26 |
| 2016/0285628 A1* | 9/2016 | Carrer | H04L 9/3228 |
| 2017/0039352 A1* | 2/2017 | Volkening | G06F 21/57 |
| 2017/0115993 A1* | 4/2017 | Sutton, II | G06F 12/1458 |
| 2019/0087577 A1* | 3/2019 | Doliwa | H04W 4/70 |

* cited by examiner

ESTABLISHING HARDWARE ROOTS OF TRUST FOR INTERNET-OF-THINGS DEVICES

CROSS-REFERENCE TO RELATED APPLICATIONS

This application is a continuation of, claims the benefit of and priority to previously filed U.S. patent application Ser. No. 14/751,531 filed Jun. 26, 2015, entitled "ESTABLISHING HARDWARE ROOTS OF TRUST FOR INTERNET-OF-THINGS DEVICES", which is hereby incorporated by reference in its entirety.

BACKGROUND

Modern computing devices are increasingly interconnected with other computing devices. Various networks and systems may be formed between such interconnected devices. This concept is often referred to as the "Internet of Things" (IoT). In general, the "things" in the IoT may refer to any computing device connected to the network. For example, the IoT may include medical devices, location tracking devices, components of an automobile, a security system, weather sensors, etc. These various devices cooperate to achieve an objective, such as, collecting data and communicating the data between devices or, even other networks.

Many of the devices of the IoT lack trusted computing capabilities. This, coupled with the large numbers of devices in the IoT, increases the vulnerability of the IoT to malicious attack. For example, a malicious or rouge device may be deployed to mascaraed as a legitimate device.

DETAILED DESCRIPTION

Figure 1:
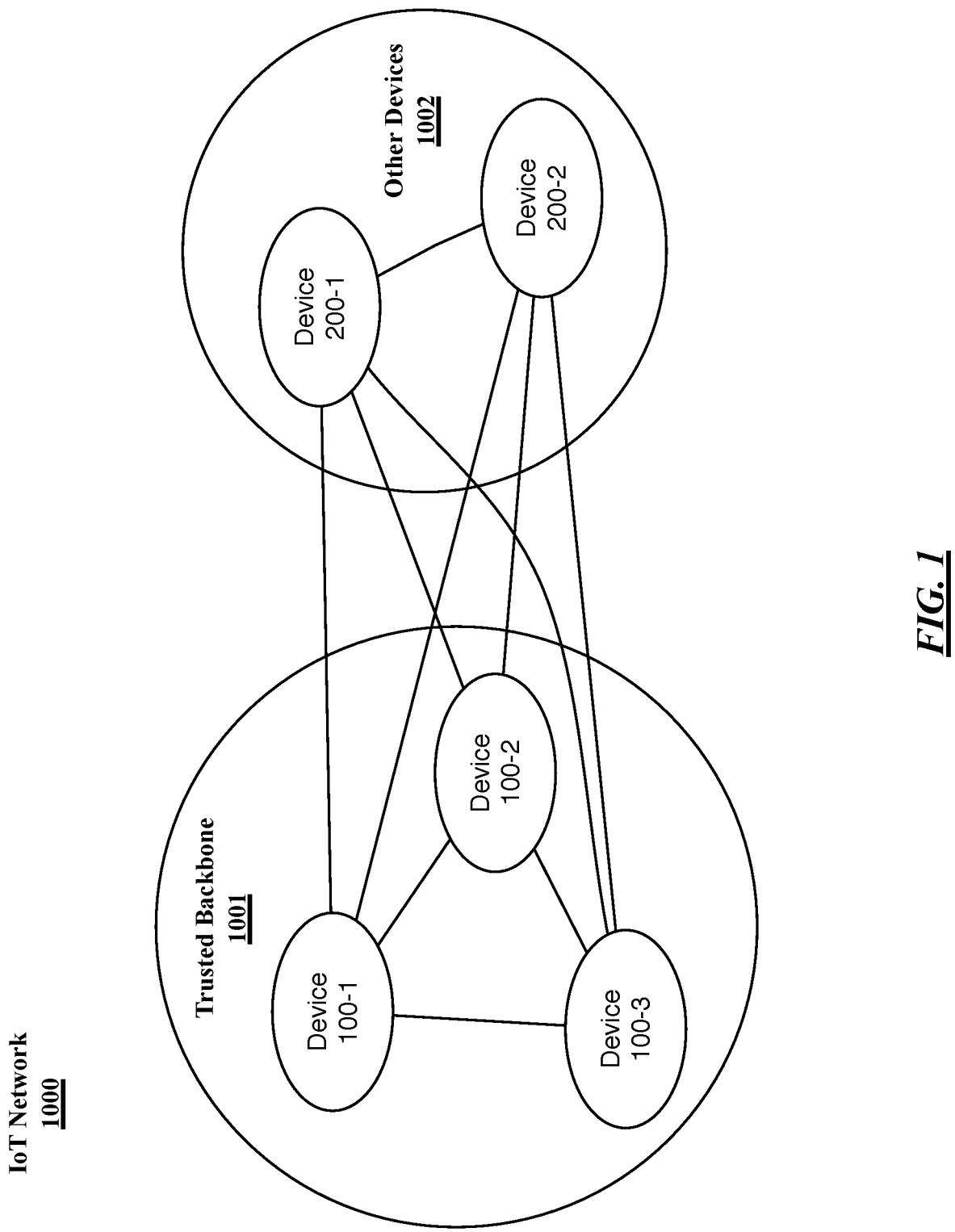
FIG. 1 is a block diagram illustrating an Internet-of-Things (IoT) network according to at least one example of the present disclosure.

Various embodiments are generally directed to an device platform to communicate in a trusted portion of a network of physical objects, such as an IoT network. In some examples, the platform may be implemented as a system-on-chip (SoC) and may be integrated into various devices such that each of the devices may implement "roots of trust" to establish a trusted portion, or a trusted backbone, of the IoT. These trusted devices can then communicate with each other in a secure or "trusted" manner. Furthermore, the trusted IoT network established by these devices may also allow less trusted or untrusted nodes to connect to the network, but may restrict their access, privileges, or control capabilities.

In general, the present disclosure provides a trusted IoT device platform including a security processor, encrypted memory, and a number of security primitives to implement a range of trusted computing capabilities, such as, for example, trusted discover, trusted enumeration, trusted firmware or software update, trusted device deployment, trusted interaction with other nodes, trusted sensing or control, etc.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
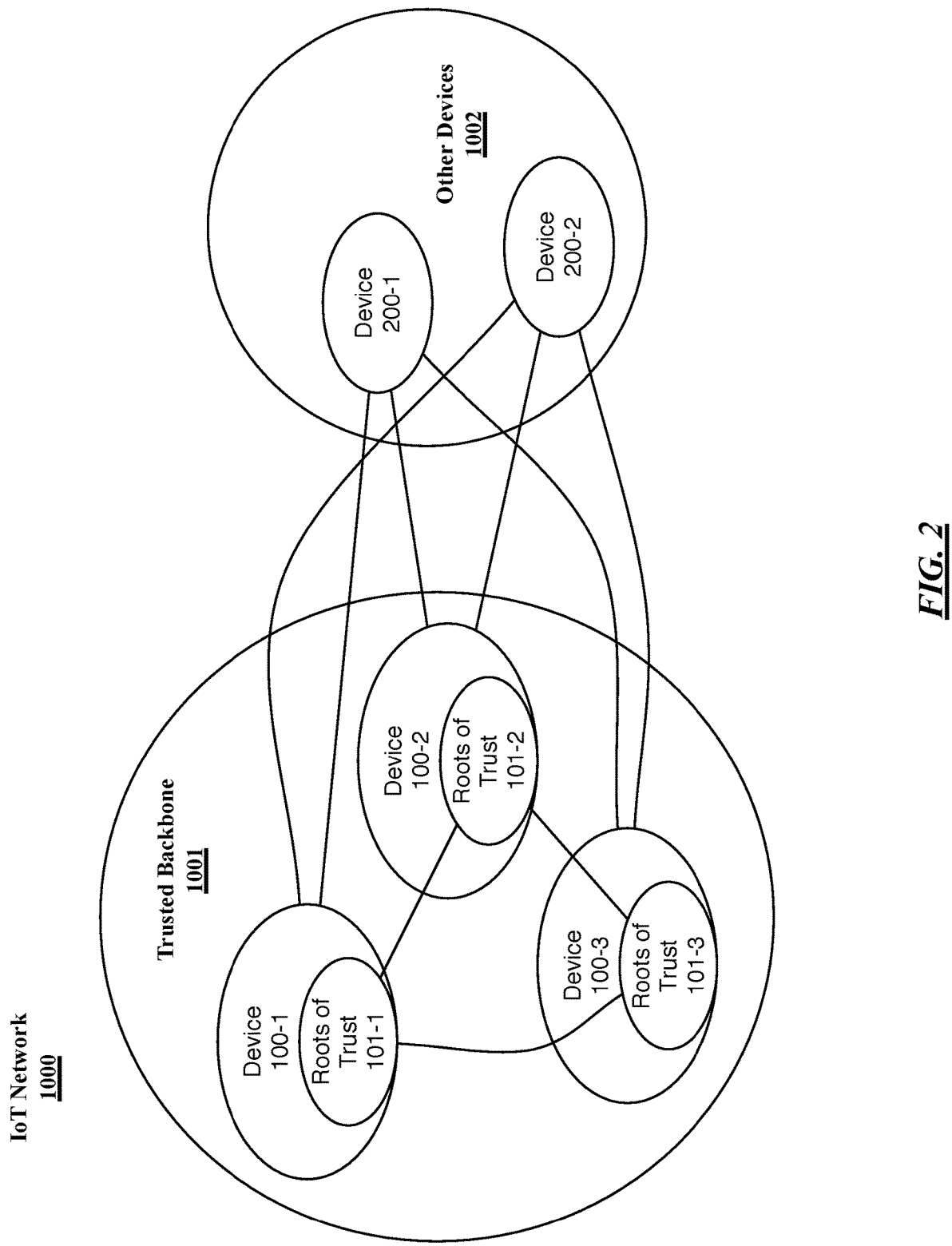
FIG. 2 is a block diagram illustrating the IoT network of FIG. 1 in greater detail.
Figure 3:
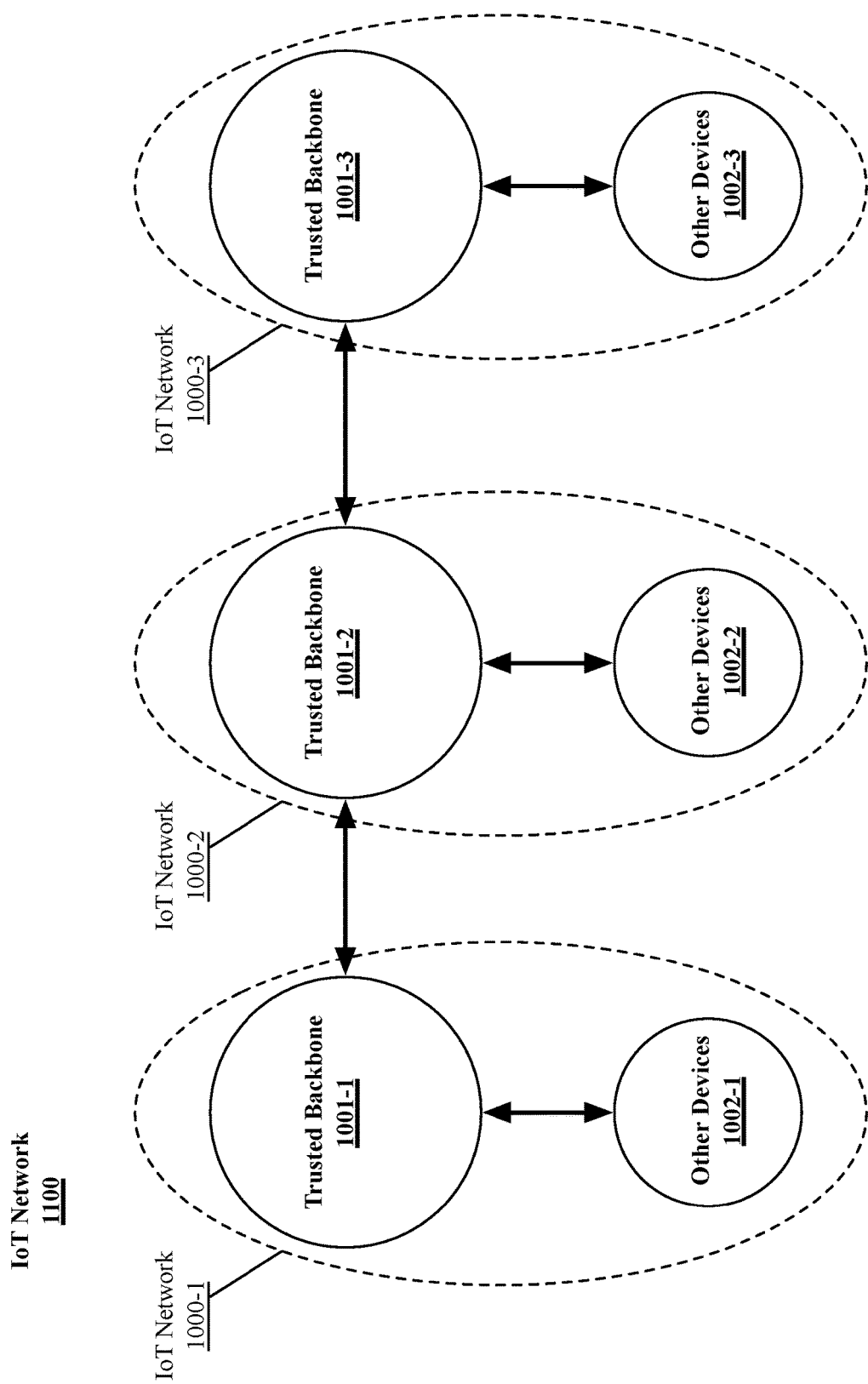
FIG. 3 is a block diagram illustrating another IoT network that includes the IoT network of FIGS. 1-2.

FIGS. 1-3 depict block diagrams of example IoT networks. In particular, FIG. 1 depicts an example IoT network, FIG. 2 depicts the example IoT network of FIG. 1 in greater detail, while FIG. 3 depicts an example IoT network that includes the IoT network of FIGS. 1-2. These example networks are depicted and described to illustrate implementations and to provide context for the present disclosure. However, they are not intended to be limiting. Following the description of the example IoT networks, a device according to examples of the present disclosure is described.

Turning to FIG. 1, a block diagram of an IoT network 1000, arranged according to at least one example of the present disclosure is depicted. The IoT network 1000 includes a trusted backbone portion 1001 and an untrusted or "other" portion 1002. The trusted backbone portion 1001 is comprised of trusted IoT devices 100-a while the other portion 1002 is comprised of other IoT devices 200-b (where "a" and "b" are positive integers, and need not be the same number). In general, the trusted backbone portion 1001 may be formed by trusted IoT devices 100-a that include or are configured with various "roots of trust" (refer to FIG. 2) to provide secure or trusted operations.

It is important to note, that although various examples depicted herein show a limited number of IoT devices in a given IoT network (e.g., the network 1000 depicted in this figure shows three (3) trusted IoT devices 100-1, 100-2, and 100-3 and two (2) other IoT devices 200-1 and 200-2), devices according to the present disclosure can be implemented in an IoT network having any number of IoT (both trusted and other) devices. However, the number of devices shown is selected for purposes of clarity of presentation and example only.

In general, each of the trusted IoT devices 100-1, 100-2, and 100-3 may incorporate a trusted IoT platform, which may be a system-on-chip (SoC) (refer to FIG. 4-7). However, the trusted IoT devices 100-1, 100-2, and 100-3 need not be identically configured and/or implemented.

In general, the IoT devices (e.g., the trusted IoT devices 100-a and/or the other IoT devices 200-b) may be any device configured to connect over the IoT network 1000. In some examples, the devices may be a home automation controller, a sensor (e.g., home automation sensor, an agricultural sensor, a weather sensor, or the like), a smart appliance, a security system component, a tracking device, a smart car component, a component in a communication system, or the like.

As noted, the trusted IoT devices 100-*a* include roots of trust to provide for trusted or secure operations. Turning to FIG. 2, the IoT network 1000 is depicted showing trusted IoT devices 100-1, 100-2, and 100-3 having roots of trust 101-1, 101-2, and 101-3, respectively. The trusted IoT devices 100-1, 100-2, and 100-3 may communicate (e.g., send and/or receive information elements, send and/or receive control signals, or the like) in a secure manner as provided by the roots of trust 101-1, 101-2, and 101-3.

In general, the roots of trust 101-1, 101-2, and 101-3 may provide for a variety of secure operations, such as, for example, trusted boot, task isolation, assignment of I/O resources to a unique container, attestation or secure discovery, introspection, trusted storage of data and/or keys, trusted I/O for sensing and/or control, cryptographic operations, cryptographic acceleration, key agreement protocols, secure channel connectivity. This is described in greater detail below, for example, with respect to FIG. 7.

Furthermore, the IoT network 1000 may provide that other devices (e.g., devices not having the roots of trust 101-*a*) may connect to the network 1000. In particular, the devices 100-*a* may allow other devices 200-*b* to connect. For example, the device 200-1 may connect to the trusted IoT devices 100-1, 100-2, and 100-3 in the trusted backbone 1001. However, the interaction may be limited due to the device 200-1 not including roots of trust. More specifically, the devices 100-1, 100-2, and 100-3 may limit their interaction with the device 200-1 to a subset of the features available over the IoT network 1000. This is described in greater detail with respect to FIG. 3.

In some examples, an IoT network may be a network of networks. For example, FIG. 3 illustrates an IoT network 1100 that includes multiple IoT networks 1000-*c* (where "c" is a positive integer). More specifically, the IoT network 1100 may include IoT networks 1000-1, 1000-2, and 1000-3, where each of the IoT networks 1000-*c* includes a trusted backbone 1001-*c* and a group of other devices 1002-*c*. As depicted, the IoT networks 1000-*c* may communicate through the trusted backbone 1001-*c*. For example, ones of the devices (refer to FIGS. 1 and 2) in the trusted backbone 1001-1 may be operably coupled to ones of the devices (refer to FIGS. 1 and 2) in the trusted backbone 1001-2 to communicate (e.g., transmit and/or receive) information elements and/or control signals to perform a function to which the IoT network is designed. Similarly, ones of the devices (refer to FIGS. 1 and 2) in the trusted backbone 1001-2 may be operably coupled to ones of the devices (refer to FIGS. 1 and 2) in the trusted backbone 1001-3 to communicate (e.g., transmit and/or receive) information elements and/or control signals to perform a function to which the IoT network is designed.

As a specific example, the devices in the IoT network 1000-1 may be various sensors and/or actuators for a weather station, while the devices in the IoT network 1000-2 may be higher level computing devices (e.g., gateways, smartphones, tablet computers, etc.), while the devices in the IoT network 1000-3 may be various cloud based services (e.g., data centers, cloud computing machines, automation enclaves, etc.). The present disclosure provides the trusted backbones 1001-1, 1000-2, and 1000-3 to control or provide the roots of trust such that only trusted devices from one level of the IoT network 1100 (e.g., the IoT network 1000-1 level devices) may communicate or interact with devices from another level (e.g., the IoT network 1000-2 level devices).

It is to be appreciated that this is merely an example implementation of the IoT devices provided herein, and it is given for purposes of clarity of presentation only, and not to be limiting. In particular, as described above, the present disclosure provides an IoT device having a trusted IoT platform to establish roots of trust to provide secure or trusted interaction in an IoT network, such as, for example, the IoT networks 1000 and/or 2000 described above.

Figure 4:
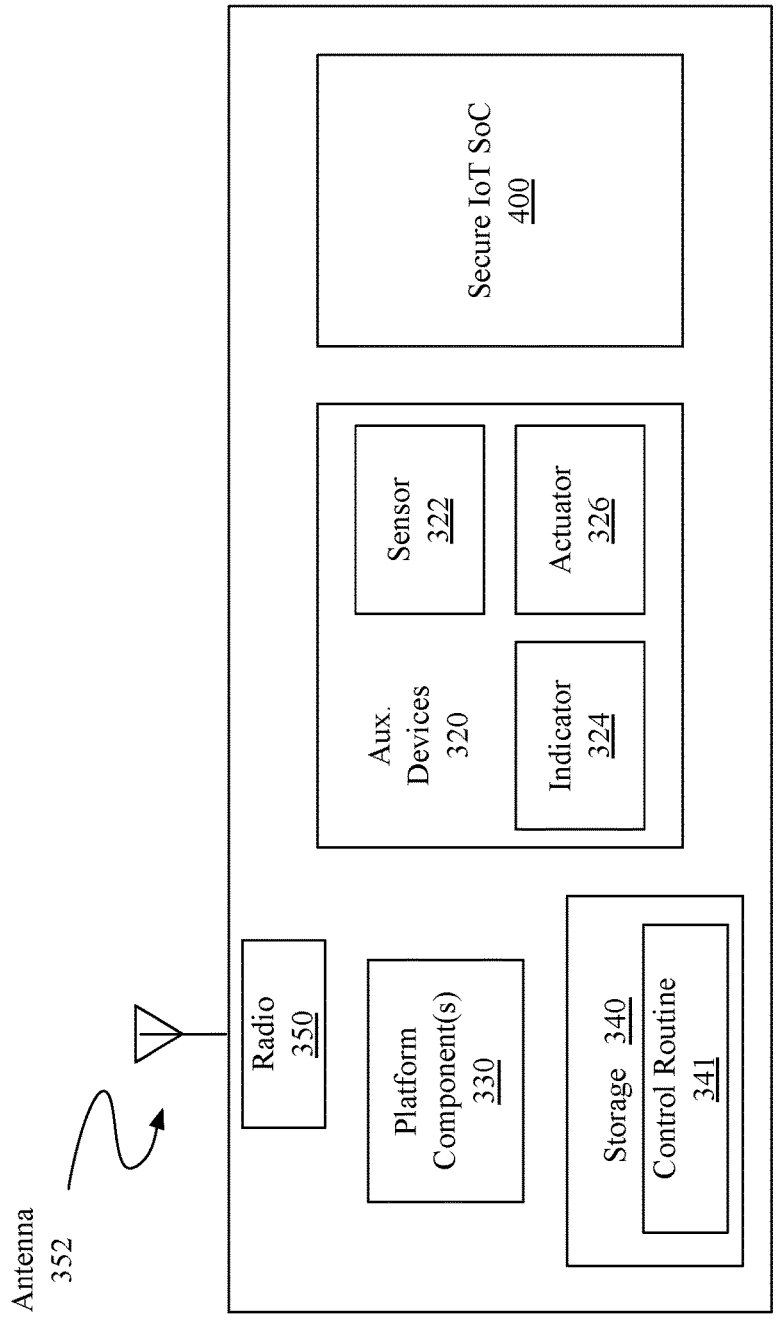
FIG. 4 is a block diagram of a trusted IoT device according to at least one example of the present disclosure.

FIG. 4 illustrates a block diagram of a trusted IoT device 300. In some examples, the trusted IoT device 300 may be implemented as one of the trusted IoT devices 100-*a* of FIGS. 1-2. As depicted, the trusted IoT device 300 includes a secure IoT SoC 400, at least one auxiliary (aux.) device 320, one or more platform components 330, a memory 340, a radio 350, and an antenna 352.

In general, the secure IoT SoC 400 may be configured to operably connect to the auxiliary devices 320, the platform components 330, the memory 340, and the radio 350 to establish or provide roots of trust (e.g., the roots of trust 101-*a*, or the like) to provide trusted IoT operation and/or capabilities. The secure IoT SoC 400 is described in greater detail below, however, in general, the secure IoT SoC 400 provides a processor, an integrated memory system, and a set of input and output (I/O) interconnects that combined provide specific trusted IoT capabilities.

The auxiliary devices may for example, include a sensor 322, an indicator 324, or an actuator 326. In general, the sensor 322 may be any of a variety of sensors, such as, for example, a temperature sensor, a wind sensor, a pressure sensor, a biometric sensor, or the like. Additionally, although not depicted, the auxiliary devices 320 may include more than one sensor 322 and/or more than one type of sensor 322. In general, the indicator 324 may be any of a variety of indicators, such as, for example, a light emitting diode, a display, a speaker, or the like. Additionally, although not depicted, the auxiliary devices 320 may include more than one indicator 324 and/or more than one type of indicator 324. In general, the actuator 326 may be any of a variety of actuators to move or control a component of system, such as, for example, a pneumatic actuator, a hydraulic actuator, an electrical actuator, or the like. Additionally, although not depicted, the auxiliary devices 320 may include more than one actuator 326 and/or more than one type of actuator 326.

The platform component(s) 330 may include any other component, such as, for example, a power supply, a battery, a reset switch, or the like.

The storage 340 may include a control routine 3410. The control routine 341 may interact with the secure IoT SoC 400. In particular, the control routine 341 may send and/or receive information elements and/or control signals, including instructions (refer to FIG. 7) to the secure IoT SoC 400. The memory may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

The radio 350 may be any radio configured to communicate signals via a wireless broadcast. For example, the radio 350 may be a Wi-Fi Direct radio, a Bluetooth radio, a BLE radio, an RFID radio, a ZigBee radio, an Ultrasound radio, or the like. The radio 340 may be operably coupled to the antenna 352 to communicate wireless signals via the antenna.

Figure 5:
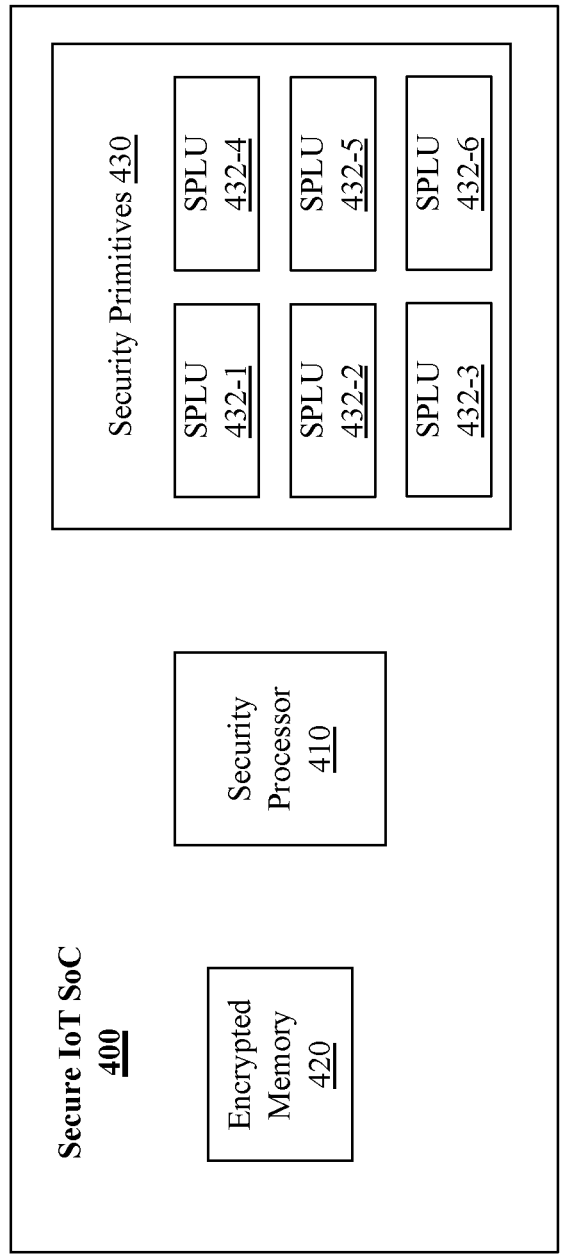
FIGS. 5-7 are block diagrams of a portion of the trusted IoT device of FIG. 4 in varying detail.
Figure 6:
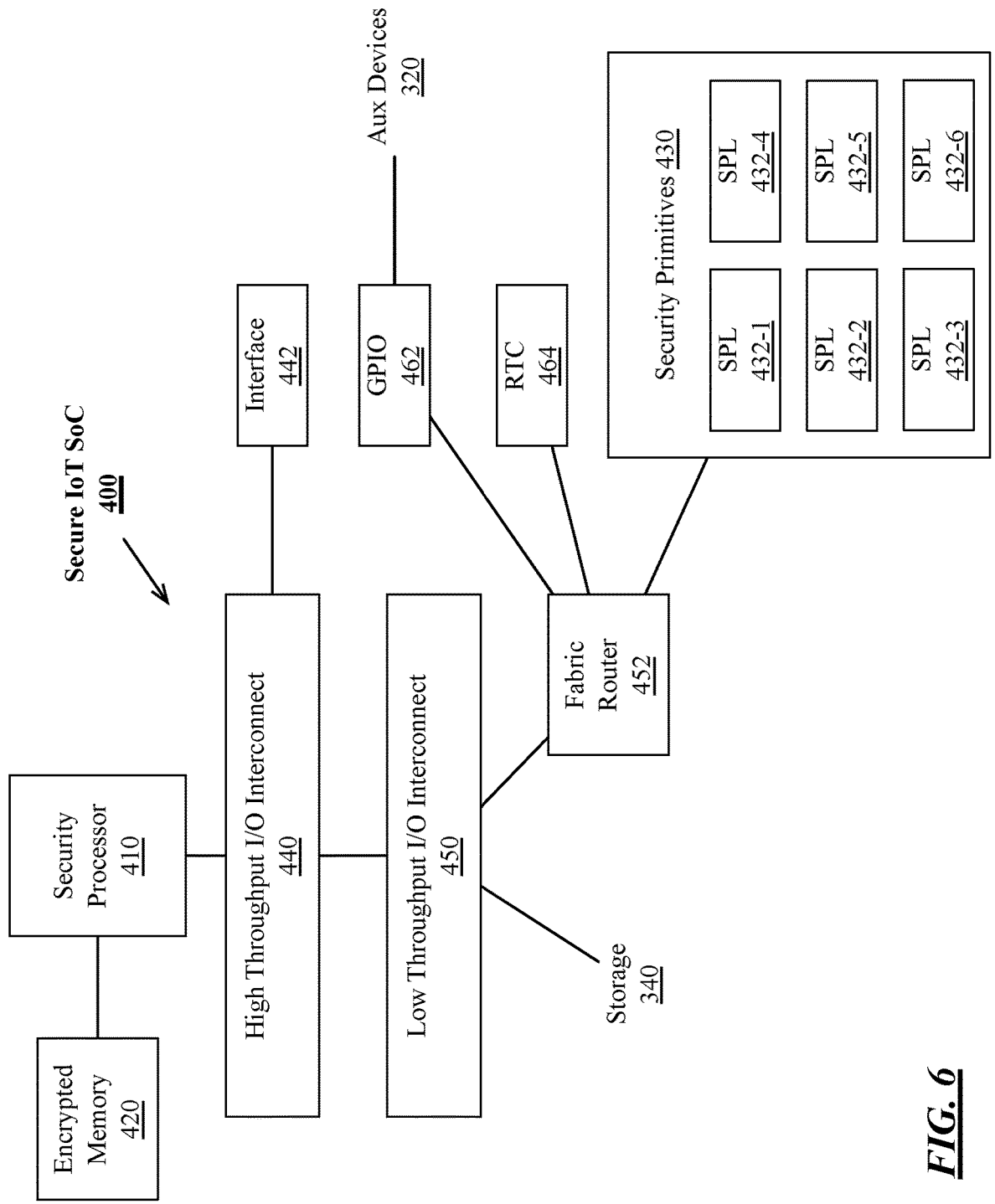

Turning to FIGS. 5-6, block diagrams depicting the secure IoT SoC 400 in greater detail are depicted. In particular, FIG. 5 illustrates an example of the secure IoT SoC 400 showing components of the SoC while FIG. 6 illustrates an example of the secure IoT SoC 400 in even greater detail.

As illustrated, the secure IoT SoC 400 includes a security processor 410, an encrypted memory 420, and security primitives 430. In particular the security primitives 430 comprise a number of logic components to perform specific security primitive operations. In particular, the security primitives 430 may comprise a number of security primitive logic units (SPLUs) 432-*d* (where "d" is a positive integer).

The security processor 410 may be a low-power processor, such as, for example, a uIA class processor (e.g., ARM® Cortex® M-Series processor, or the like). The security processor 410 is configured to isolate tasks (refer to FIG. 7), includes an instruction set (refer to FIG. 7) supporting a number of cryptographic functions. For example, the instruction set may include instructions for encrypting and/or decrypting information elements. In particular, the instruction set may include cryptographic instructions, such as, for example, instruction to implement advanced encryption standard (AES) cryptography, secure hash algorithm (SHA) (e.g., SHA2, or the like) cryptography, modular exponentiation, or the like.

Additionally, the instruction set may include instructions to implement code protection features, such as, for example, return-oriented programming (ROP), instrumentation, no-execute bits, or the like. With some example, the security processor may be a 32-bit processor. In some examples, the security processor may be a 64-bit processor but may limit the addressable memory. In particular the encrypted memory may not be large enough to need a 64-bits processor. However, the 64-bit architecture may provide increased efficiency for various cryptographic functions implemented by the security processor's instruction set.

The encrypted memory 420 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

Additionally, the encrypted memory 420 may include a memory controller (refer to FIG. 7) configured to respect task isolation boundaries in memory pages. For example, the memory controller may segment memory along task boundaries, such that references outside a tasks boundaries may generate a page fault. Furthermore, in some examples, the memory controller may implement encryption standards and/or protocols to encrypt data stored in the encrypted memory 420.

In general, the security primitives 430 include SPLUs (e.g., 432-1, 432-2, etc.), where each of the SPLUs implements a security feature. As noted, the security processor 410 includes an instruction set, the instruction set may include instructions that utilize logic and/or functions implemented by the security primitive 430.

In some example, one or more of the SPLUs (e.g., 432-1, 432-2, etc.) may be configured to implement one of more cryptographic key management features. For example, one of the SPLUs may implement Diffie-Hellman key agreement using enhanced privacy ID (EPID) signing. In some examples, one or more of the SPLUs (e.g., 432-1, 432-2, etc.) may be a one time programmable fuse (OTP). In general, a OTP may be programmed with a value by the manufacturer or device implementer to facilitate trusted operation.

For example, an OTP may be programmed with a value corresponding to an EPID private key to enable trusted anonymous discovery. In some example, an OTP may be programmed with a value corresponding to an asymmetric storage key to derive storage key for a storage hierarchy. In particular, the symmetric storage key may be used to re-derive the storage key hierarchy each time the device 300 restarts. In some examples, an OTP may be programmed with a value corresponding to a lock-code used to provision firmware updates, software patches, or the like. For example, the lock-code may correspond to an Intel® Chipset Locking Service (ICLS) key. In some examples, an OTP may be programmed with a value corresponding to a security version number. More specifically, the security version number may be used to identify the platform to which the other OTP values (e.g., the storage hierarchy key, the EPID private key, the ICLS key, or the like) pertain.

In some example, one or more of the SPLUs (e.g., 432-1, 432-2, etc.) may be configured to implement one of more cryptographic acceleration functions. For example, one of the SPLUs may implement an AES accelerator, an elliptic curve cryptography (ECC) accelerator, a modular exponentiation accelerator, or the like.

In some example, one or more of the SPLUs (e.g., 432-1, 432-2, etc.) may be configured to implement one of more secure booting functions. For example, one of the SPLUs may implement a secure boot ROM. In particular, the secure boot ROM may be configured to verify and/or authenticate a boot-loader or device loader. Additionally, the secure boot ROM may be configured to verify loaders from a secure signing authority (e.g., OEM, IoT network service provider, or the like).

In some example, one or more of the SPLUs (e.g., 432-1, 432-2, etc.) may be configured to store (e.g., in one or more registers, in a programmable memory, often referred to FLASH memory, or the like) secure boot results, whitelists to verify images as they are loaded into the encrypted memory and/or updated (e.g., via network provisioning, or the like).

In some example, one or more of the SPLUs (e.g., 432-1, 432-2, etc.) may be configured to implement a random number generator. In some example, one or more of the SPLUs (e.g., 432-1, 432-2, etc.) may be configured to implement a monotonic counter.

Turning more specifically to FIG. 6, the secure IoT SoC 400 is shown including a high throughput I/O interconnect 440 and a low throughput I/O interconnect 450. As depicted the security processor 410 is operably connected to the encrypted memory 420 and to the high throughput I/O interconnect 440. Furthermore, the high throughput I/O interconnect 440 is operably connected to the low throughput I/O interconnect 450.

In some examples, the secure IoT SoC 400 may include an interface 442 operably coupled to the high throughput I/O interconnect 440. Additionally, although not depicted, the high throughput I/O interconnect 440 may also be operably connected to one or more controllers, such as, for example, a graphics controller or display interface, etc.

The interface 440 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.11n, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

The low throughput I/O interconnect is operably coupled to a fabric router 452. In some examples, the fabric router may include logic and/or features to route information elements, control signals, instructions to the security primitives.

Furthermore, the secure IoT SoC 400 may include a general purpose input and output (GPIO) connector 462 and a real-time clock (RTC) 464, which may be operably coupled to the fabric router 400. It is noted, that the secure IoT SoC 400 may be implemented in a variety of IoT type devices for a variety of different functions. As such, in practice the secure IoT SoC may be operably coupled to any of a number of different sensors and/or actuators (e.g., the auxiliary devices 320). The GPIO 462 provides logic and/or features to control and interact with these devices.

Furthermore, the secure IoT SoC 400, in particular, the low throughput I/O interconnect 440 may operably connect to the storage 340.

Figure 7:
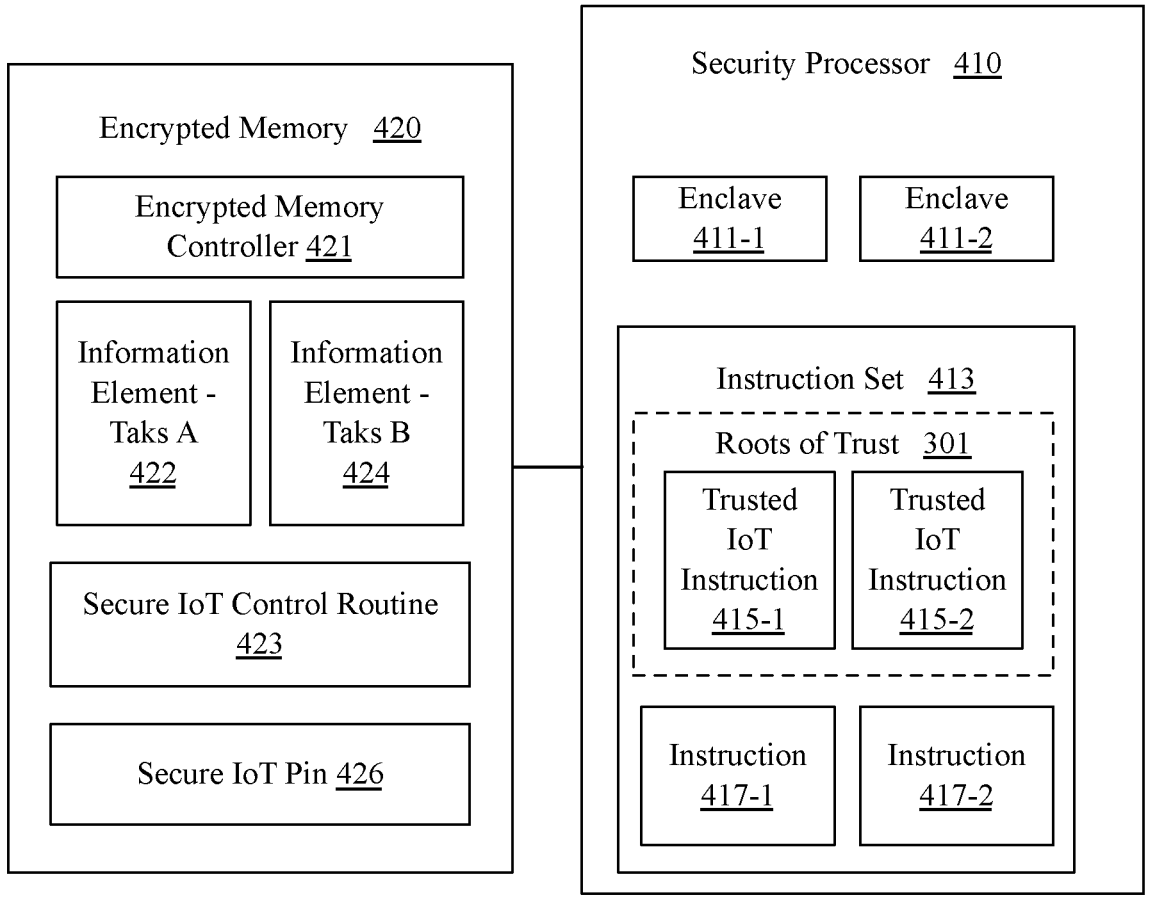

FIG. 7 illustrates a block diagram of the security processor 410 and the encrypted memory 420 in greater detail. The encrypted memory 420 may include an encrypted memory controller 421, a number of information elements 422, 424, etc., such as, for example, corresponding to tasks executed by the security processor 410, a secure IoT control routine 423, and a secure IoT pin 426. In general, the encrypted memory controller 421 and the secure IoT control routine 423 may provide for task isolation. This is described in greater detail below.

The security processor 410 may include one or more enclaves, such as, enclaves 411-1 and 411-2. The enclaves 411-1 and 411-2 may include a portion of the secure processor 410 that can function independently from and/or restrict access from other parts of the secure processor 410. Additionally, the secure processor 410 includes an instruction set 413 comprising a number trusted IoT instructions 415-$e$ (where "$e$" is a positive integer). In particular, the trusted IoT instructions 415-1 and 415-2 are depicted.

These trusted IoT instructions 415-1 and 415-2 may be used to implement or establish the roots of trust described herein. In particular, the instructions 415-1 and 415-2 may be used establish roots of trust 301 for the device 300, in which the secure IoT SoC 400 is implemented. In some examples, the trusted IoT instructions 415-1 and 415-2 (it is to be appreciated, that the trusted IoT instructions are not limited to two (2)) may correspond to instructions to be processed (e.g., executed, or the like) by one or more of the security primitives 432. For example, the trusted IoT instructions 415-1 and 415-2, corresponding to the root of trust 301 may be service discovery, secure boot update, encryption key management, connectivity or interface control, secure storage, certificate verification, peer access control, threat intelligence, trusted install service, attestation services, or the like.

Additionally, in some examples, the instruction set 413 may include other instructions 417-1 and 417 (it is to be appreciated, that the trusted IoT instructions are not limited to two (2))

In various examples, the instructions (e.g., the trusted IoT instructions 415-1 and 415-2 and the instructions 417-1 and 417-2 may be utilized (e.g., the processor may be caused to execute them, or the like) by various software application that operate on the secure IoT device, such as, for example, the control routine 341 or by the secure IoT control routine 423.

In general, each of the control routines 341 and/or 423 may incorporate a sequence of instructions operative on the processor component 410, in its role as a main processor component to implement logic to perform various functions. For example, the secure IoT control routine 423 may incorporate a sequence of instructions operative on the processor component 410 to cause the secure IoT SoC 400 to enforce task isolation boundaries for Ring 0 drivers that service Ring 3 code, for example, isolated using Intel® software guard extensions (SGX). Furthermore, the secure IoT control routine 423 may include logic implementing an operating system (OS) that incorporates a task isolation aware kernel. Additionally, the secure IoT control routine 423 may include logic implementing a connectivity stack (not shown) to establish connectivity services (e.g., via the radio 350 and the antenna 352) and expose the connectivity services to various trusted IoT functions in a task isolated environment.

In some examples, the secure IoT control routine 423 may be configured to generate the secure IoT pin 426. In some examples, the secure IoT pin 426 may be generated at time of manufacture, for example, using a onetime fuse, or the like. Furthermore, the secure IoT SoC, in executing the secure IoT control routine 423, may communicate the secure IoT pin 426 an auxiliary device 320 (e.g., an indicator, or the like) such that another device (e.g., an IoT network management tool, an out-of-band (OOB) device, or the like) may receive an information element to include an indication of the secure IoT pin 426 to facilitate establishment of roots of trust in the IoT network as described herein.

In particular, the secure IoT control routine 423 may send a control signal to an auxiliary device 320 to cause the secure IoT pin 426 to be communicated via an OOB channel during an attestation handshake that may be constructed using a Diffie-Hellman protocol where the Diffie-Hellman parameters are defined to include a permutation of the secure IoT pin 426 value. More specifically, the Diffie-Hellman parameters may be constructed such that either side of the protocol concludes that the other side must know the secure IoT pin 426 value or they would not be able to complete the Diffie-Hellman exchange, thereby authenticating the intention to pair the secure IoT Soc 400 with the IoT network management tool.

In some examples, the auxiliary device may be an LED, an OLED, an LCD, a CRT, or other display to display a QR code. The IoT network management tool may comprise a camera to view the QR code to reveal the secure IoT pin 426 value. As such, the secure IoT pin 426 may be shared by both the secure IoT SoC 400 and the IoT management tool. As another example, the auxiliary device 420 may be speaker or other device to emit a high frequency sound that the IoT management tool may detect, for example, via a microphone to obtain the secure IoT pin 426. As another example, the auxiliary device may be a haptic indicator to emit the secure IoT pin 426 encoded using vibrations that an IoT management tool may detect, for example, using an accelerometer to receive the secure IoT pin 426. As another example, the auxiliary device 420 may be a short wave radar device to emit the secure IoT pin 426 encoded in a radar signal that an IoT management tool may detect, for example, using a radar receiver to receive the secure IoT pin 426. As another example, the auxiliary device 420 may be an NFC radio to emit the secure IoT pin 426 to an IoT management tool, for example, using an NFC receiver to obtain the secure IoT pin 426. As another example, the auxiliary device 420 may encode the secure IoT pin 426 by modulating light emission, such as, modulating current over an anode of an LED according to a pattern that may be perceived by a light sensor but imperceptible to a human observer (e.g., using various forms of stenography, or the like).

In some examples, communication of the pin may be coupled with a secondary authentication token (e.g., a hand gesture, or the like) supplied by a user and known to the IoT management tool to authorize collection of the secure IoT pin 426.

In some implementations, an IoT network management device may receive the secure IoT pin 426 from the secure IoT SoC 400 to attest to the secure IoT SoC 400 configuration using an embedded manufacturer's credential. In some implementations, an IoT network management device may receive the secure IoT pin 426 from the secure IoT SoC 400 to pair the secure IoT SoC 400 to another IoT device or to otherwise takes ownership or control of the device to provision it with trusted network management services. In some implementations, an IoT network management device may receive the secure IoT pin 426 from the secure IoT SoC 400 to provision the secure IoT SoC 400 with peer-device credentials and access policies.

Figure 8:
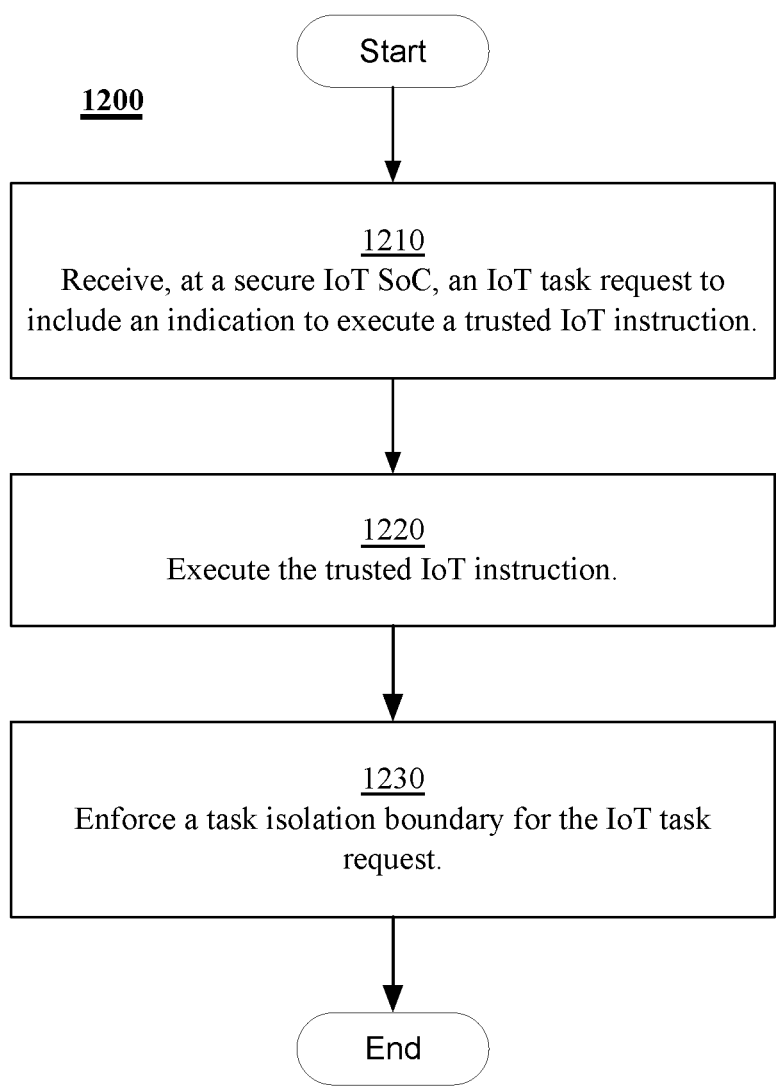
FIG. 8 illustrates an example logic flow of the present disclosure.
Figure 9:
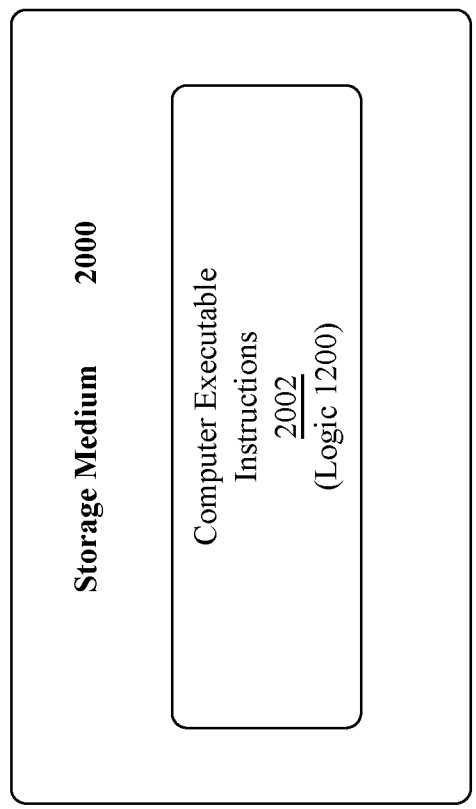
FIG. 9 illustrates a storage medium according to an example of the present disclosure.

FIG. 8 illustrates an example embodiments of a logic flow that may be implement by the trusted IoT devices 100 in the IoT network 1000 or 1100, the trusted IoT device 300, and/or the secure IoT SoC 400. The illustrated logic flow may be representative of some or all of the operations executed by one or more embodiments described herein. Although the logic flows are described with reference to FIGS. 1-7, examples are not limited in this context.

Turning more specifically to FIG. 8, a logic flow 1200 is depicted. The logic flow 1200 may begin at block 1210. At block 1201 "receive, at a secure IoT SoC, an IoT task request to include an indication to execute a trusted IoT instruction," the secure IoT SoC 400 may receive a task request to include an indication to execute on of the trusted IoT instructions 415-1 or 415-2.

Continuing to block 1220, "execute the trusted IoT instruction," the secure IoT SoC 400 may execute the trusted IoT instruction. In particular, the security processor 410 may execute the trusted IoT instruction 415-1 or 415-2. In some examples, the security processor may execute the trusted IoT instruction 415-1 or 415-2 by utilizing one of the SPLUs 432. For example, the security processor may send a control signal to one of the SPLUs (e.g., the SPLU 432-1, 432-2, etc.) to execute logic to accelerate a cryptographic calculation, to securely boot the secure IoT SoC, to provide an encryption hierarchy key, or the like.

Continuing to block 1230, "enforce a task isolation boundary for the IoT task request," the security processor 410 may enforce a task isolation boundary for the task request. For example, the security processor may enforce a task isolation boundary for Ring 3) drivers that service Ring 3 instructions.

FIG. 8 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions 2002, such as instructions to implement the logic flow 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
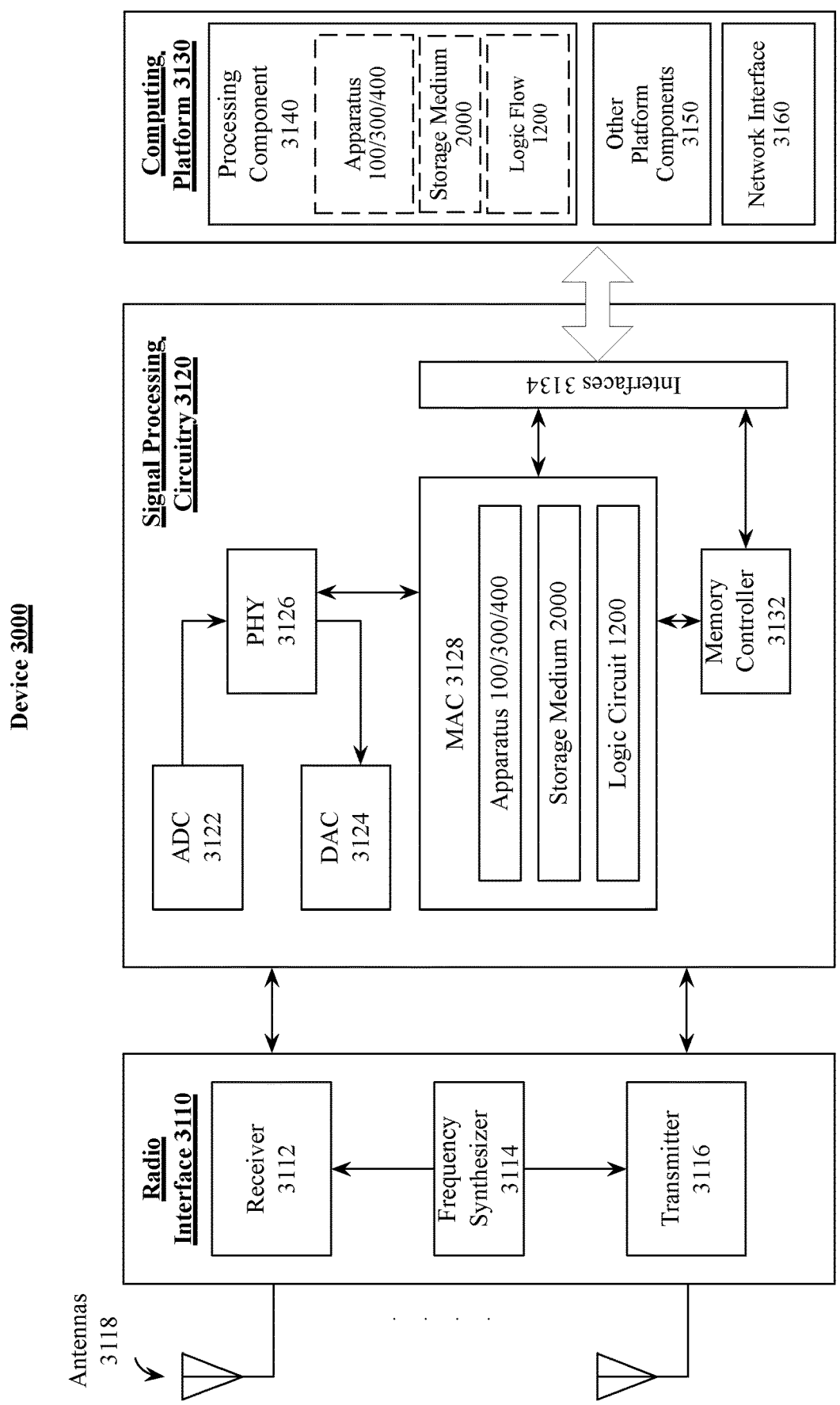
FIG. 10 illustrates a processing architecture according to an example of the present disclosure.

FIG. 10 illustrates an embodiment of a device 3000. In some examples, device 3000 may be configured or arranged for wireless communications in a network such that the network 1000 and/or 1100 discussed above. In some examples, one of the devices 100-*a*, 300, and/or 400 may be implemented in the device 3000. For example, the device 3000 may implement the device as apparatus 100-*a*. Additionally, the device 3000 may implement storage medium 2000 and/or a logic circuit 1200. The logic circuits may include physical circuits to perform operations described for the apparatus 100-*a*, storage medium 2000, logic flow 1100 and/or logic flow 1200. As shown in this figure, device 3000 may include a radio interface 3110, baseband circuitry 3120, and computing platform 3130, although examples are not limited to this configuration.

The device 3000 may implement some or all of the structure and/or operations for the apparatus 100-*a*, the storage medium 2000 and/or the logic circuit 1200 in a single computing entity, such as entirely within a single device. The embodiments are not limited in this context.

Radio interface 3110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 3110 may include, for example, a receiver 3112, a transmitter 3116 and/or a frequency synthesizer 3114. Radio interface 3110 may include bias controls, a crystal oscillator and antennas 3118-1 to 3118-*f*. In another embodiment, radio interface 3110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 3120 may communicate with radio interface 3110 to process receive and/or transmit signals and may include, for example, an analog-to-digital converter 3122 for down converting received signals, a digital-to-analog converter 3124 for up converting signals for transmission. Further, baseband circuitry 3120 may include a baseband or physical layer (PHY) processing circuit 3126 for PHY link layer processing of respective receive/transmit signals. Baseband circuitry 3120 may include, for example, a processing circuit 3128 for medium access control (MAC)/data link layer processing. Baseband circuitry 3120 may include a memory controller 3132 for communicating with MAC processing circuit 3128 and/or a computing platform 3130, for example, via one or more interfaces 3134.

In some embodiments, PHY processing circuit 3126 may include a frame construction and/or detection module, in combination with additional circuitry such as a buffer memory, to construct and/or deconstruct communication frames (e.g., containing subframes). Alternatively or in addition, MAC processing circuit 3128 may share processing for certain of these functions or perform these processes independent of PHY processing circuit 3126. In some embodiments, MAC and PHY processing may be integrated into a single circuit.

Computing platform 3130 may provide computing functionality for device 3000. As shown, computing platform 3130 may include a processing component 3140. In addition to, or alternatively of, baseband circuitry 3120 of device 3000 may execute processing operations or logic for the apparatus 100-*a*, storage medium 2000, and logic circuits 1200 using the processing component 3130. Processing component 3140 (and/or PHY 3126 and/or MAC 3128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 3130 may further include other platform components 3150. Other platform components 3150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 3130 may further include a network interface 3160. In some examples, network interface 3160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 3000 may be part of a device in a network and may be included in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 3000 may be implemented using any combination of discrete circuitry, application specific integrated circuits (ASICs), logic gates and/or single chip architectures. Further, the features of device 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
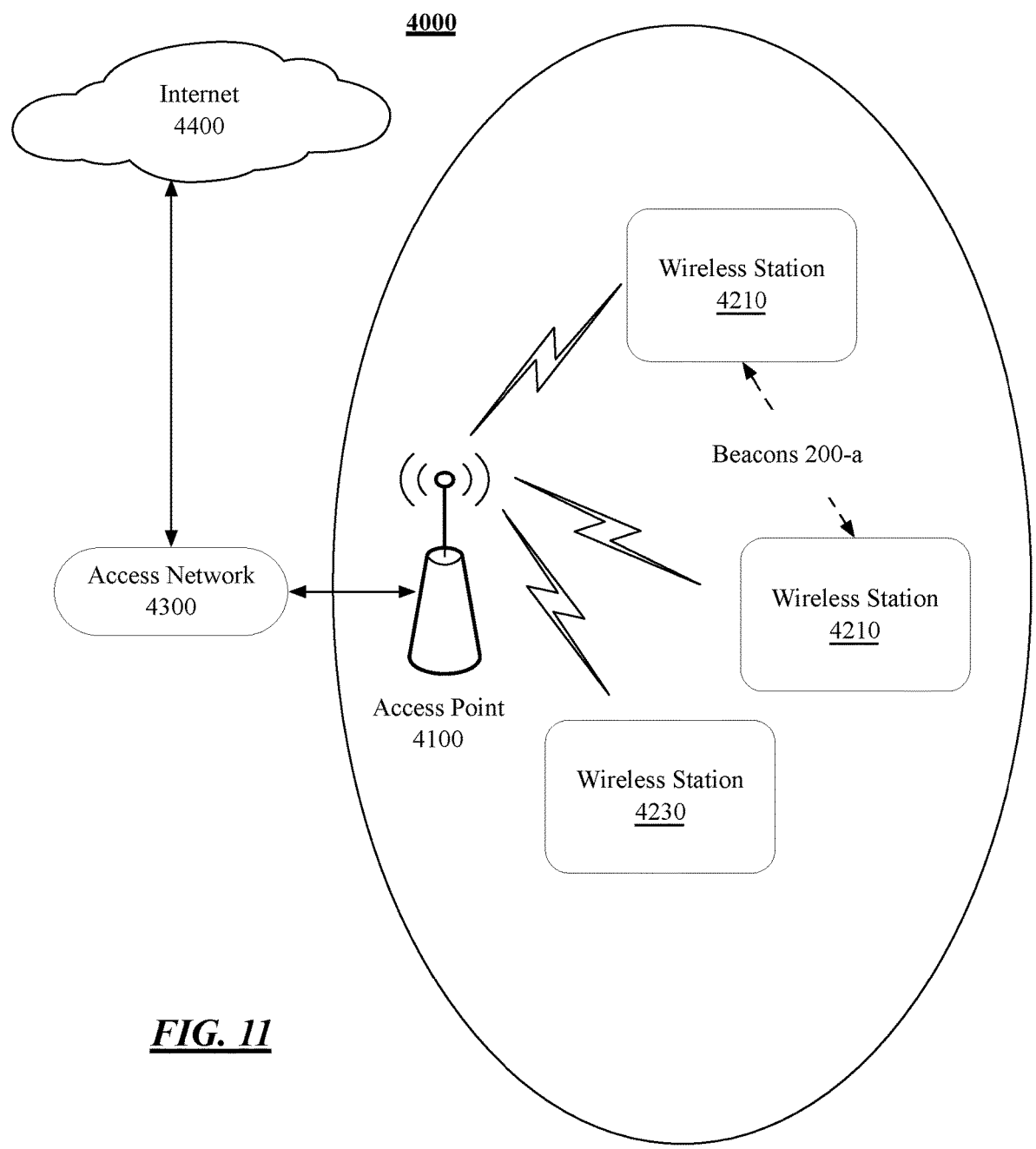
FIG. 11 illustrates a network according to an example of the present disclosure.

FIG. 11 illustrates an embodiment of a wireless network 4000. As shown in this figure, wireless network 4000 comprises an access point 4100 and wireless stations 4210, 4220, and 4230. In various embodiments, wireless network 4000 may comprise a Internet-of-Things (IoT) network.

In some embodiments, wireless network 4000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 4210, 4220, and 4230 may communicate with access point 4100 in order to obtain connectivity to one or more external data networks. In some embodiments, for example, wireless stations 4210, 4220, and 4230 may connect to the Internet 4400 via access point 4100 and access network 4300. In various embodiments, access network 4300 may comprise a private network that provides subscription-based Internet-connectivity, such as an Internet Service Provider (ISP) network. The embodiments are not limited to this example.

In various embodiments, two or more of wireless stations 4210, 4220, and 4230 may communicate with each other directly by exchanging peer-to-peer communications. For example, as depicted in this figure, wireless stations 4210 and 4220 communicate with each other directly by exchanging peer-to-peer communications 4500. In some embodiments, such peer-to-peer communications may be performed according to one or more standards, such as, for example, the Bluetooth standard referenced above. The embodiments, however, are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose might be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

The disclosure now turns to providing various example implementations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The disclosure now turns to providing additional examples.

EXAMPLE 1

An apparatus comprising: a system-on-chip (SoC), the SoC comprising: a security processor comprising an instruction set, the instruction set comprising one or more trusted instructions; an encrypted memory unit operably coupled to the security processor, the encrypted memory unit to store a plurality of information elements and to isolate a first one of the plurality of information elements from a second one of the plurality of information elements; and one or more security primitive logic units (SPLUs) operably coupled to the security processor, at least one of the one or more trusted instruction to comprise logic to be executed, at least in part, by the one or more SPLUs.

EXAMPLE 2

The apparatus of example 1, the security processor to execute at least one of the one or more trusted instructions to provide a plurality of roots of trust in a network of physical objects.

EXAMPLE 3

The apparatus of example 1, the network of physical object an Internet-of-Things (IoT) network.

EXAMPLE 4

The apparatus of example 1, comprising a general purpose input and output (GPIO) connector operably coupled to the SoC, the SoC to send or receive a control signal to one or more auxiliary devices via the GPIO connector.

EXAMPLE 5

The apparatus of example 4, the SoC device comprising an input and output (I/O) interconnect controller operably coupled to the security processor and the one or more SPLUs, the I/O interconnect controller to communicatively couple the security processor and the one or more SPLUs.

EXAMPLE 6

The apparatus of example 5, the I/O interconnect controller comprising: a high throughput I/O interconnect; and a low throughput I/O interconnect.

EXAMPLE 7

The apparatus of example 6, comprising a fabric router operably coupled to the low throughput I/O interconnect and the one or more SPLUs, the fabric router to route at least one of the trusted instructions or one of the plurality of information elements between the low throughput I/O interconnect and the one or more SPLUs.

EXAMPLE 8

The apparatus of example 7, the GPIO connector operably coupled to the SoC via the low throughput I/O interconnect and the fabric router.

EXAMPLE 9

The apparatus of example 8, the one or more auxiliary devices comprising a sensor, an actuator, or an indicator.

EXAMPLE 10

The apparatus of example 8, the one or more auxiliary device comprising an indicator to communicate a secure pin via an out-of-band channel to establish a root of trust.

EXAMPLE 11

The apparatus of example 10, the indicator a light emitting diode (LED), an organic LED, a liquid crystal display, a cathode ray tube display, a speaker, a haptic indicator, a short wave radar transmitter, or a near field communication (NFC) radio.

EXAMPLE 12

The apparatus of example 10, the root of trust to attest to the authenticity of the apparatus or to provision the apparatus with security settings.

EXAMPLE 13

The apparatus of example 1, the encrypted memory unit comprising a memory controller, the memory controller to receive a control signal to include an indication that the first one of the plurality of information elements corresponds to a first task and the second one of the plurality of information elements corresponds to a second task and to isolate the first one of the plurality of information elements from the second one of the plurality of information elements based on the received control signal.

EXAMPLE 14

The apparatus of example 1, the one or more SPLUs comprising a one time programmable fuse, a cryptographic key, an asymmetric storage key, a secure boot read only memory, a cryptographic accelerator, an elliptic curve cryptography accelerator, a modular exponentiation accelerator, or a random number generator.

EXAMPLE 15

The apparatus of example 1, the security processor a low power processor, a uIA class processor, or a 64-bit processor.

EXAMPLE 16

The apparatus of example 1, the one or more trusted instructions to comprise one or more cryptographic instructions.

EXAMPLE 17

A system for establishing roots of trust in a network comprising: a system-on-chip (SoC), the SoC comprising: a security processor comprising an instruction set, the instruction set comprising one or more trusted instructions; an encrypted memory unit operably coupled to the security processor, the encrypted memory unit to store a plurality of information elements and to isolate a first one of the plurality of information elements from a second one of the plurality of information elements; and one or more security primitive logic units (SPLUs) operably coupled to the security processor, at least one of the one or more trusted instruction to comprise logic to be executed, at least in part, by the one or more SPLUs; one or more auxiliary devices operably coupled to the SoC; and a radio operably coupled to the SoC.

EXAMPLE 18

The system of example 17, the security processor to execute at least one of the one or more trusted instructions to provide a plurality of roots of trust in an network.

EXAMPLE 19

The system of example 17, comprising a general purpose input and output (GPIO) connector operably coupled to the SoC, the SoC to send or receive a control signal to the one or more auxiliary devices via the GPIO connector.

EXAMPLE 20

The system of example 19, the SoC device comprising an input and output (I/O) interconnect controller operably coupled to the security processor and the one or more SPLUs, the I/O interconnect controller to communicatively couple the security processor and the one or more SPLUs.

EXAMPLE 21

The system of example 20, the I/O interconnect controller comprising: a high throughput I/O interconnect; and a low throughput I/O interconnect.

EXAMPLE 22

The system of example 21, comprising a fabric router operably coupled to the low throughput I/O interconnect and the one or more SPLUs, the fabric router to route at least one of the trusted instructions or one of the plurality of information elements between the low throughput I/O interconnect and the one or more SPLUs.

EXAMPLE 23

The system of example 22, the GPIO connector operably coupled to the SoC via the low throughput I/O interconnect and the fabric router.

EXAMPLE 24

The system of example 23, the one or more auxiliary devices comprising a sensor, an actuator, or an indicator.

EXAMPLE 25

The system of example 23, the one or more auxiliary device comprising an indicator to communicate a secure pin via an out-of-band channel to establish a root of trust.

EXAMPLE 26

The system of example 25, the indicator a light emitting diode (LED), an organic LED, a liquid crystal display, a cathode ray tube display, a speaker, a haptic indicator, a short wave radar transmitter, or a near field communication (NFC) radio.

EXAMPLE 27

The system of example 25, the root of trust to attest to the authenticity of the apparatus or to provision the apparatus with security settings.

EXAMPLE 28

The system of example 17, the encrypted memory unit comprising a memory controller, the memory controller to receive a control signal to include an indication that the first one of the plurality of information elements corresponds to a first task and the second one of the plurality of information elements corresponds to a second task and to isolate the first one of the plurality of information elements from the second one of the plurality of information elements based on the received control signal.

EXAMPLE 29

The system of example 17, the one or more SPLUs comprising a one time programmable fuse, a cryptographic key, an asymmetric storage key, a secure boot read only memory, a cryptographic accelerator, an elliptic curve cryptography accelerator, a modular exponentiation accelerator, or a random number generator.

EXAMPLE 30

The system of example 17, the security processor a low power processor, a uIA class processor, or a 64-bit processor.

EXAMPLE 31

The apparatus of example 17, the one or more trusted instructions to comprise one or more cryptographic instructions.

EXAMPLE 32

The system of example 18, comprising an antenna, the radio to send and receive signals via the antenna, wherein the radio is a WiFi radio, a Bluetooth radio, a Bluetooth Low Energy radio, or a ZigBee radio.

EXAMPLE 33

An Internet-of-Things (IoT) device comprising: at least one of a sensor, an actuator, or an indicator; and a system-on-chip (SoC), the SoC comprising: a security processor comprising an instruction set, the instruction set comprising one or more trusted Internet-of-Things (IoT) instructions to cause the SoC to send a control signal to the sensor, the actuator, or the indicator; an encrypted memory unit operably coupled to the security processor, the encrypted memory unit to store a plurality of information elements and to isolate a first one of the plurality of information elements from a second one of the plurality of information elements; and one or more security primitive logic units (SPLUs) operably coupled to the security processor, at least one of the one or more trusted IoT instruction to comprise logic to be executed, at least in part, by the one or more SPLUs.

EXAMPLE 34

The IoT device of example 33, the security processor to execute at least one of the one or more trusted IoT instructions to provide a plurality of roots of trust in an IoT network.

EXAMPLE 35

The IoT device of example 33, comprising a general purpose input and output (GPIO) connector operably coupled to the SoC, the SoC to send or receive a control signal to the sensor, the actuator, or the indicator.

EXAMPLE 36

The IoT device of example 35, the SoC device comprising an input and output (I/O) interconnect controller operably coupled to the security processor and the one or more SPLUs, the I/O interconnect controller to communicatively couple the security processor and the one or more SPLUs.

EXAMPLE 37

The IoT device of example 36, the I/O interconnect controller comprising: a high throughput I/O interconnect; and a low throughput I/O interconnect.

EXAMPLE 38

The IoT device of example 37, comprising a fabric router operably coupled to the low throughput I/O interconnect and the one or more SPLUs, the fabric router to route at least one of the trusted IoT instructions or one of the plurality of information elements between the low throughput I/O interconnect and the one or more SPLUs.

EXAMPLE 39

The IoT device of example 38, the GPIO connector operably coupled to the SoC via the low throughput I/O interconnect and the fabric router.

EXAMPLE 40

The IoT device of example 38, the one or more auxiliary device comprising an indicator to communicate a secure IoT pin via an out-of-band channel to establish a root of trust.

EXAMPLE 41

The IoT device of example 40, the indicator a light emitting diode (LED), an organic LED, a liquid crystal display, a cathode ray tube display, a speaker, a haptic indicator, a short wave radar transmitter, or a near field communication (NFC) radio.

EXAMPLE 42

The IoT device of example 40, the root of trust to attest to the authenticity of the apparatus or to provision the apparatus with security settings.

EXAMPLE 43

The IoT device of example 33, the encrypted memory unit comprising a memory controller, the memory controller to receive a control signal to include an indication that the first one of the plurality of information elements corresponds to a first task and the second one of the plurality of information elements corresponds to a second task and to isolate the first one of the plurality of information elements from the second one of the plurality of information elements based on the received control signal.

EXAMPLE 44

The IoT device of example 33, the one or more SPLUs comprising a one time programmable fuse, a cryptographic key, an asymmetric storage key, a secure boot read only memory, a cryptographic accelerator, an elliptic curve cryptography accelerator, a modular exponentiation accelerator, or a random number generator.

EXAMPLE 45

The IoT device of example 33, the security processor a low power processor, a uIA class processor, or a 64-bit processor.

EXAMPLE 46

The IoT device of example 33, the one or more trusted IoT instructions to comprise one or more cryptographic instructions.

EXAMPLE 47

A method comprising: receiving, at a secure System-on-Chip (SoC), a first task request, the first task request to include an indication to execute a first one of a plurality of trusted instructions, the secure SoC comprising a security processor and an encrypted memory, the security processor comprising an instruction set comprising the plurality of trusted instructions; executing the first one of the plurality of trusted instruction to provide one or more roots of trust in a network of physical objects; and enforce a boundary of the first task request.

EXAMPLE 48

The method of example 47, comprising: generating a first information element based on the first task request; and storing the first information element in the encrypted memory.

EXAMPLE 49

The method of example 48, comprising: receiving, at the secure SoC, a second task request, the second task request to include an indication to execute a second one of a plurality of trusted instructions; executing the second one of the trusted instruction to provide the one or more roots of trust in the network; generating a second information element based on the second task request; storing the second information element in the encrypted memory; and isolating the first information element from the second information element in the encrypted memory.

EXAMPLE 50

The method of example 47, the secure SoC comprising one or more security primitive logic units (SPLUs) operably coupled to the security processor, at least one of the plurality of trusted instructions to comprise logic to be executed, at least in part, by the one or more SPLUs.

EXAMPLE 51

The method of example 50, the secure SoC comprising an input and output (I/O) interconnect controller operably coupled to the security processor and the one or more SPLUs, the I/O interconnect controller to communicatively couple the security processor and the one or more SPLUs.

EXAMPLE 52

The method of example 51, the I/O interconnect controller comprising: a high throughput I/O interconnect; and a low throughput I/O interconnect.

EXAMPLE 53

The method of example 52, the secure SoC comprising a fabric router operably coupled to the low throughput I/O interconnect and the one or more SPLUs, the fabric router to route at least one of the trusted instructions or one of the plurality of information elements between the low throughput I/O interconnect and the one or more SPLUs.

EXAMPLE 54

The method of example 53, the GPIO connector operably coupled to the SoC via the low throughput I/O interconnect and the fabric router, the GPIO connector to operably couple the security processor to one or more of a sensor, an actuator, or an indicator.

EXAMPLE 55

The method of example 47, the one or more SPLUs comprising a one time programmable fuse, a cryptographic key, an asymmetric storage key, a secure boot read only memory, a cryptographic accelerator, an elliptic curve cryptography accelerator, a modular exponentiation accelerator, or a random number generator.

EXAMPLE 56

The method of example 47, the security processor a low power processor, a uIA class processor, or a 64-bit processor.

EXAMPLE 57

The method of example 50, the plurality of trusted instructions to comprise one or more cryptographic instructions.

EXAMPLE 58

At least one machine readable medium comprising a plurality of instructions that in response to being executed on a wearable device causes the wearable computing device to perform the method of any of examples 47 to 57.

EXAMPLE 59

An apparatus for an SoC device, the apparatus comprising means for performing the method of any one of examples 47 to 57.

What is claimed is:

1. An apparatus for establishing or for utilizing hardware roots of trust for data protection in Internet-of-Things devices, the apparatus comprising:
   a processor;
   one or more security primitive logic units (SPLUs) coupled to the processor;
   an interconnect coupled to the processor; and
   memory coupled to the processor, the memory comprising instructions, which when executed by the processor cause the processor to:
     receive, via the interconnect, a first information element from a first external device;
     determine whether the first external device is within a root of trust of one or more roots of trust; and
     send, based on a determination that the first external device is within the root of trust of the one or more roots of trust, a first control signal to at least one of the one or more SPLUs to cause the at least one of the one or more SPLUs to execute a trusted instruction to isolate the first information element within the memory.

2. The apparatus of claim 1, the memory comprising instructions, which when executed by the processor cause the processor to isolate, based at least in part on the trusted instruction executed by the at least one of the one or more SPLUs, the first information element from other information elements in the memory.

3. The apparatus of claim 1, the memory comprising instructions, which when executed by the processor cause the processor to:
   receive, via the interconnect, a second information element from a second external device;
   determine whether the second external device is within the root of trust of the one or more roots of trust; and
   send, based on a determination that the second external device is within the root of trust of the one or more roots of trust, a second control signal to the at least one of the one or more SPLUs to cause the at least one of the one or more SPLUs to execute the trusted instruction to isolate the second information element with the first information element within the memory.

4. The apparatus of claim 3, the memory comprising instructions, which when executed by the processor cause the processor to send, based on a determination that the second external device is not within the root of trust of the one or more roots of trust, a second control signal to the at least one of the one or more SPLUs to cause the at least one of the one or more SPLUs to execute the trusted instruction to isolate the first information element from the second information element within the memory.

5. The apparatus of claim 1, the memory comprising instructions, which when executed by the processor cause the processor to:
   receive, via the interconnect, a second information element from a second external device, wherein the root of trust of the one or more roots of trust is a first root of trust;
   determine whether the second external device is within a second root of trust of the one or more roots of trust; and
   send, based on a determination that the second external device is within the second root of trust of the one or more roots of trust, a second control signal to the at least one of the one or more SPLUs to cause the at least one of the one or more SPLUs to execute the trusted instruction to isolate the second information from the first information element within the memory.

6. The apparatus of claim 1, the memory comprising instructions, which when executed by the processor cause the processor to:
   send a second control signal to another one of the one or more SPLUs to cause the another one of the one or more SPLUs to execute an additional trusted instruction to establish the root of trust of the one or more roots of trust; and
   establish, based at least in part on the additional trusted instruction executed by the another one of the one or more SPLUs, the root of trust.

7. The apparatus of claim 1, comprising at least one of a sensor, an actuator, or an indicator.

8. The apparatus of claim 1, the apparatus and the first external device a plurality of devices in a network of physical devices.

9. The apparatus of claim 8, the root of trust of the one or more roots of trust to attest to the authenticity of the apparatus or to provision the apparatus with security settings.

10. The apparatus of claim 1, the one or more SPLUs comprising a one time programmable fuse, a cryptographic key, an asymmetric storage key, a secure boot read only memory, a cryptographic accelerator, an elliptic curve cryptography accelerator, a modular exponentiation accelerator, or a random number generator.

11. The apparatus of claim 1, the trusted instructions to comprise one or more cryptographic instructions.

12. A system for establishing or for utilizing hardware roots of trust for data protection in Internet-of-Things devices, the system comprising:
   a first device, comprising:
      a first processor;
      one or more first security primitive logic units (SPLUs) coupled to the first processor;
      a first interconnect coupled to the first processor; and
      first memory coupled to the first processor, the first memory comprising instructions, which when executed by the first processor cause the first processor to:
         receive, via the first interconnect, a first information element from a second device;
         determine whether the second device is within a root of trust of one or more roots of trust; and
         send, based on a determination that the second device is within the root of trust of the one or more roots of trust, a first control signal to at least one of the one or more first SPLUs to cause the at least one of the one or more first SPLUs to execute a trusted instruction to isolate the first information element within the first memory.

13. The system of claim 12, comprising the second device.

14. The system of claim 13, the second device comprising:
   a second processor;
   one or more second SPLUs coupled to the second processor;
   a second interconnect coupled to the second processor; and
   second memory coupled to the second processor, the second memory comprising instructions, which when executed by the second processor cause the second processor to:
      receive, via the second interconnect, a second information element from a third device;
      determine whether the third device is within the root of trust of the one or more roots of trust; and
      send, based on a determination that the third device is within the root of trust of the one or more roots of trust, a second control signal to at least one of the one or more second SPLUs to cause the at least one of the one or more second SPLUs to execute the trusted instruction to isolate the second information element within the second memory.

15. The system of claim 13, the first device and the second device are among a plurality of devices in a network of Internet-of-Things (IoT) devices.

16. The system of claim 12, the first memory comprising instructions, which when executed by the first processor cause the first processor to isolate, based at least in part on the trusted instruction executed by the at least one of the one or more first SPLUs, the first information element from other information elements in the first memory.

17. The system of claim 12, the first memory comprising instructions, which when executed by the first processor cause the first processor to:
   receive, via the first interconnect, a second information element from a third device;
   determine whether the third device is within the root of trust of the one or more roots of trust; and
   send, based on a determination that the third device is within the root of trust of the one or more roots of trust, a second control signal to the at least one of the one or more first SPLUs to cause the at least one of the one or more first SPLUs to execute the trusted instruction to isolate the second information element with the first information element within the memory.

18. The system of claim 17, the first memory comprising instructions, which when executed by the first processor cause the first processor to send, based on a determination that the third device is not within the root of trust of the one or more roots of trust, a second control signal to the at least one of the one or more first SPLUs to cause the at least one of the one or more first SPLUs to execute the trusted instruction to isolate the first information element from the second information element within the first memory.

19. The system of claim 12, the first memory comprising instructions, which when executed by the first processor cause the first processor to:
   receive, via the first interconnect, a second information element from third device, wherein the root of trust of the one or more roots of trust is a first root of trust;
   determine whether the third device is within a second root of trust of the one or more roots of trust; and
   send, based on a determination that the third device is within the second root of trust of the one or more roots of trust, a second control signal to the at least one of the one or more first SPLUs to cause the at least one of the one or more first SPLUs to execute the trusted instruction to isolate the second information from the first information element within the memory.

20. The system of claim 12, the first memory comprising instructions, which when executed by the first processor cause the first processor to:
   send a second control signal to another one of the one or more first SPLUs to cause the another one of the one or more first SPLUs to execute an additional trusted instruction to establish the root of trust of the one or more roots of trust; and
   establish, based at least in part on the additional trusted instruction executed by the another one of the one or more first SPLUs, the root of trust.

21. At least one non-transitory machine-readable medium for establishing or for utilizing hardware roots of trust for data protection in Internet-of-Things devices, the at least one non-transitory machine-readable medium comprising a plurality of instructions that in response to being executed by a processor on first device causes the processor to:
   receive a first information element from a second device;
   determine whether the second device is within a root of trust of one or more roots of trust; and
   send, based on a determination that the second device is within the root of trust of the one or more roots of trust, a first control signal to at least one of one or more first security primitive logic units (SPLUs) of the first device to cause the at least one of the one or more SPLUs to execute a trusted instruction to isolate the first information element within memory of the first device.

22. The at least one non-transitory machine-readable medium of claim 21, comprising instructions that when executed by the processor cause the processor to:
receive a second information element from a third device;
determine whether the third device is within the root of trust of the one or more roots of trust; and
send, based on a determination that the third device is within the root of trust of the one or more roots of trust, a second control signal to the at least one of the one or more SPLUs to cause the at least one of the one or more SPLUs to execute the trusted instruction to isolate the second information element with the first information element within the memory.

23. The at least one non-transitory machine-readable medium of claim 22, comprising instructions that when executed by the processor cause the processor to send, based on a determination that the third device is not within the root of trust of the one or more roots of trust, a second control signal to the at least one of the one or more SPLUs to cause the at least one of the one or more SPLUs to execute the trusted instruction to isolate the first information element from the second information element within the memory.

24. The at least one non-transitory machine-readable medium of claim 21, the medium comprising instructions that when executed by the processor cause the processor to:
receive a second information element from a third device, wherein the root of trust of the one or more roots of trust is a first root of trust;
determine whether the third device is within a second root of trust of the one or more roots of trust; and
send, based on a determination that the third device is within the second root of trust of the one or more roots of trust, a second control signal to the at least one of the one or more SPLUs to cause the at least one of the one or more SPLUs to execute the trusted instruction to isolate the second information from the first information element within the memory.

25. The at least one non-transitory machine-readable medium of claim 21, the medium comprising instructions that when executed by the processor cause the processor to
send a second control signal to a second SPLU of the plurality of SPLUs to cause the second SPLU of the plurality of SPLUs to execute a second trusted instruction to establish the root of trust of the one or more roots of trust; and
establish, based at least in part on the second trusted instruction executed by the second SPLU of the plurality of SPLUs, the root of trust.

* * * * *